No. 743,478. PATENTED NOV. 10, 1903.
W. T. FOX.
ENGINE.
APPLICATION FILED JUNE 13, 1901.
NO MODEL. 5 SHEETS—SHEET 1.

Witnesses.
Elizabeth Perry
Walter B. Payne.

Inventor.
William T. Fox
by Frederick H. Church
his Attorney.

No. 743,478. PATENTED NOV. 10, 1903.
W. T. FOX.
ENGINE.
APPLICATION FILED JUNE 13, 1901.
NO MODEL. 5 SHEETS—SHEET 2.

Witnesses. Inventor.

No. 743,478. PATENTED NOV. 10, 1903.
W. T. FOX.
ENGINE.
APPLICATION FILED JUNE 13, 1901.
NO MODEL. 5 SHEETS—SHEET 3.

Witnesses.
Inventor.
William T. Fox
Attorney.

No. 743,478. Patented November 10, 1903.

UNITED STATES PATENT OFFICE.

WILLIAM T. FOX, OF ROCHESTER, NEW YORK, ASSIGNOR TO ROCHESTER STEAM MOTOR WORKS, OF ROCHESTER, NEW YORK, A CORPORATION OF NEW YORK.

ENGINE.

SPECIFICATION forming part of Letters Patent No. 743,478, dated November 10, 1903.

Application filed June 13, 1901. Serial No. 64,423. (No model.)

*To all whom it may concern:*

Be it known that I, WILLIAM T. FOX, of Rochester, in the county of Monroe and State of New York, have invented certain new and useful Improvements in Engines; and I do hereby declare the following to be a full, clear, and exact description of the same, reference being had to the accompanying drawings, forming a part of this specification, and to the reference letters and numerals marked thereon.

My invention has for its object to provide an improved steam or vapor engine embodying a plurality (preferably two) of cylinders having pistons therein connected for relative movement and containing parts adapted to register with passages or ports in the cylinders, whereby the steam operating alternately upon the opposite ends of one piston is controlled by another piston, said ports being so arranged that the inlet and exhaust of the steam is accomplished to move the pistons during a portion of the stroke under expansion of the steam and to cushion the pistons in their cylinders at the ends of the stroke, thereby preventing the engine from pounding and making a device that operates smoothly and noiselessly.

My invention has for its further object to provide an engine having such an arrangement of ports and steam-passages that its operation in either direction may be governed by a single valve controlling both the inlet and exhaust, whereby the steam may be directed to either end of the cylinders.

To these and other ends the invention consists in certain improvements in construction and combination of parts, all as will be hereinafter fully described, the novel features being pointed out in the claims at the end of this specification.

In the drawings.

Similar reference letters and numerals in the several figures indicate similar parts.

The engine which I have shown consists of a casing embodying the cylinders A' and B', in which operate the trunk-pistons A and B, inclosed in the cylinders by the heads 1 and 2, arranged at the upper and lower ends thereof, respectively. Attached to the upper ends of the pistons are the rods 3 3', operating through stuffing-boxes 4 and secured in cross-heads 5 5', the latter being guided on the rods 6, mounted on the head 1 and which are connected at their outer ends by a frame 7. On the opposite or lower cylinder-head 2 are brackets 8, carrying the journal boxes or bearings 10, in which is mounted the driving-shaft 12, carrying the driving wheel or sprocket 13. At the ends of the shaft are formed the cranks 14 and 15, arranged quartering or at an angle of ninety degrees to each other, as shown, and connected to the cross-heads 5 5' by connecting-rods 14' and 15', respectively, operating at opposite sides of the engine. By arranging these parts as described it will be readily seen that I am enabled to employ long connecting-rods, which give a comparatively direct motion between the cross-heads and the cranks at all portions of the stroke, thereby causing the middle points of the piston to more approximately register with the similar points of their cylinders when the cranks are on the quarter-stroke; and this object is accomplished without increasing the length of the engine, as would otherwise be the case were these results to be obtained by placing the said parts in alinement at one end of the cylinders. Furthermore, in this construction, in which the driving-shaft is located at the end of the engine opposite the piston-rods, I am enabled to support it with said rods at the upper side, thereby bringing the parts which are liable to require more frequent adjustment, such as the glands or stuffing-boxes 4, into a more convenient and accessible position for the operator.

The operation of each piston is controlled by the movement of the other, each piston alternately governing the passage of live and exhaust steam to and from each end of the other cylinder, thereby constituting in themselves perfectly-timed slide-valves, which coöperate with ports suitably arranged to produce this result. The pistons A and B are preferably constructed in a tubular form to reduce their weight and are closed at their ends to form the heads thereon, as will be understood. The slide-valves are formed by cut-out portions warped or curved about the periphery of each piston, forming recesses therein, (indicated by $A^2$ $A^4$ and $B^2$ $B^4$,) the former being arranged on the piston A and adapted to coöperate with ports $a$, $e$, and $c$, arranged in the cylinder A', while the latter, located on the piston B, coöperate with similarly-arranged ports $d$, $b$, and $f$ in the cylinder B'. These apertures or cut-out portions are extended longitudinally of the pistons at each side, as indicated by $A^{12}$ $A^{20}$ $A^{14}$ $A^{40}$ and $B^{12}$, $B^{20}$, $B^{14}$, and $B^{40}$, the first series of said extensions being adapted to coöperate with ports $w$ and $z$ to connect them at stated intervals with the ports $a$ $e$ $c$ and which are out of line therewith. Ports $x$ and $y$, leading into the cylinder B', are arranged similarly to the ports $w$ and $z$ and at times are connected, by the second series of extended cut-out portions of the piston B, with the ports $d$ $b$ $f$.

17 indicates suitable packing-rings located on the pistons to provide steam-tight connections between the latter and the sides of their cylinders.

Figure 6:
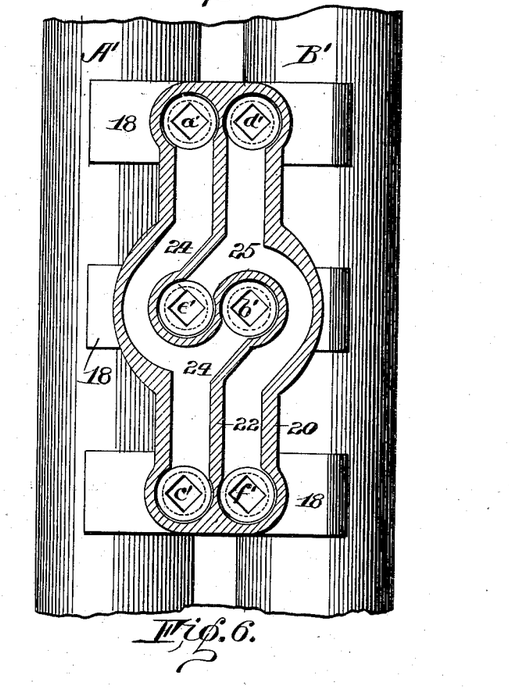
Fig. 6 is a sectional view on the line IV IV of Fig. 2.
Figure 7:
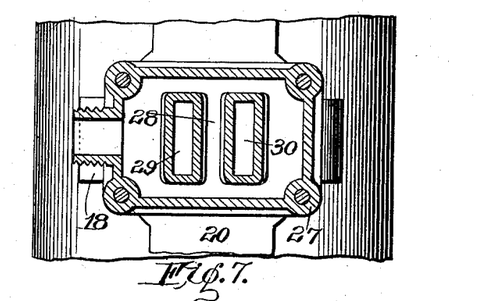
Fig. 7 is a sectional view on the line V V of Fig. 3.

The various ports heretofore mentioned lead at their ends to the interior of the cylinders and are connected to the opposite cylinder or passages leading directly to the steam supply or exhaust, as will be presently described. Upon the exterior of the casing and at the same side thereof the similar ports $a$ and $d$, $e$ and $b$, $c$ and $f$ are covered by bridges or casings 18, preferably formed integrally with the casing, beneath each of which are formed separate chambers $a'$ $b'$ $c'$ and $d'$ $e'$ $f'$, connecting with each of said ports, respectively. A shell 20 is located above the bridges and secured thereto by means of hollow thimbles or sleeves 21, threaded through the proximate portions of the shell and bridges and opening communication between the interior of the former and the chambers in the several bridges, although indiscriminate communication between the said chambers is prevented by means of a division wall or partition 22 in the shell, forming passages 24 and 25, as shown particularly in Fig. 6. The former passage connects the chambers $a'$ $b'$ $c'$ and the latter the chambers $d'$ $e'$ $f'$. The shell 20, as described, is connected to the bridges 18 by the hollow thimbles 21, and to facilitate manipulating the latter they are formed with an irregular-shaped aperture adapted to receive the end of a wrench inserted through apertures in the top of the shell, the latter being normally closed by plugs or screw-caps 50.

The steam-controlling valve is located centrally upon the shell 20 and embodies a casing 27, in which is formed an exhaust channel or passage 28, surrounding and extending between transversely-extending passages 29 and 30, leading into the passages 25 and 24. Arranged above the casing 27 is a cover 31, into which the intermediate portion of the passage 28, extending between the passages 29 and 30, leads, and in the cover is arranged a movable valve-plate 32, having in its lower side an elongated aperture 33, adapted to connect either of the passages 29 or 30 with the intermediate portion of the passage 28, while the other passage is uncovered by the plate and opened directly to form an inlet for the steam introduced through the pipe 35. In order to provide a convenient means for shifting the plate, I arrange on the top thereof a rack 36, with which a segmental gear 37 coöperates, the latter being mounted upon an arbor 38, passing through a stuffing-box 39 and provided with an operating-handle 40.

Figure 1:
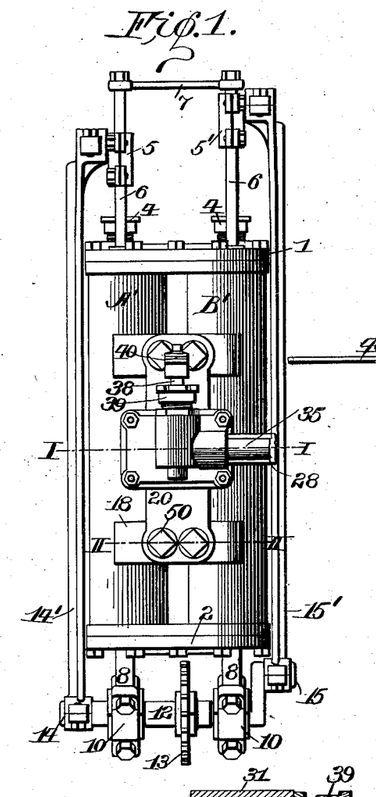
Figure 1 is a front elevation of an engine constructed in accordance with my invention.
Figure 2:
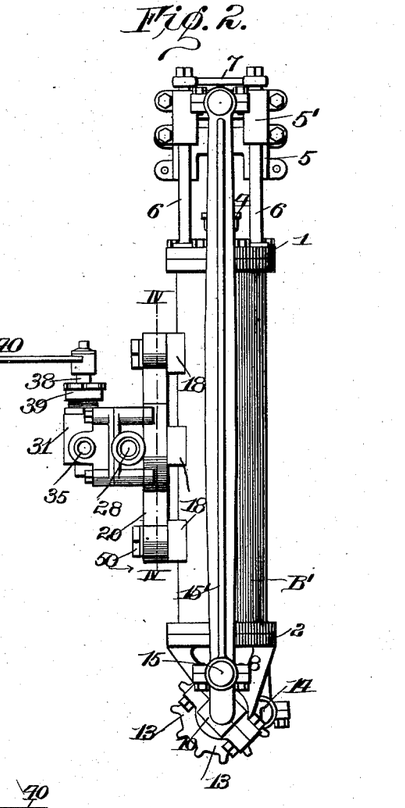
Fig. 2 is a side elevation thereof.
Figures 3, 4, 12:
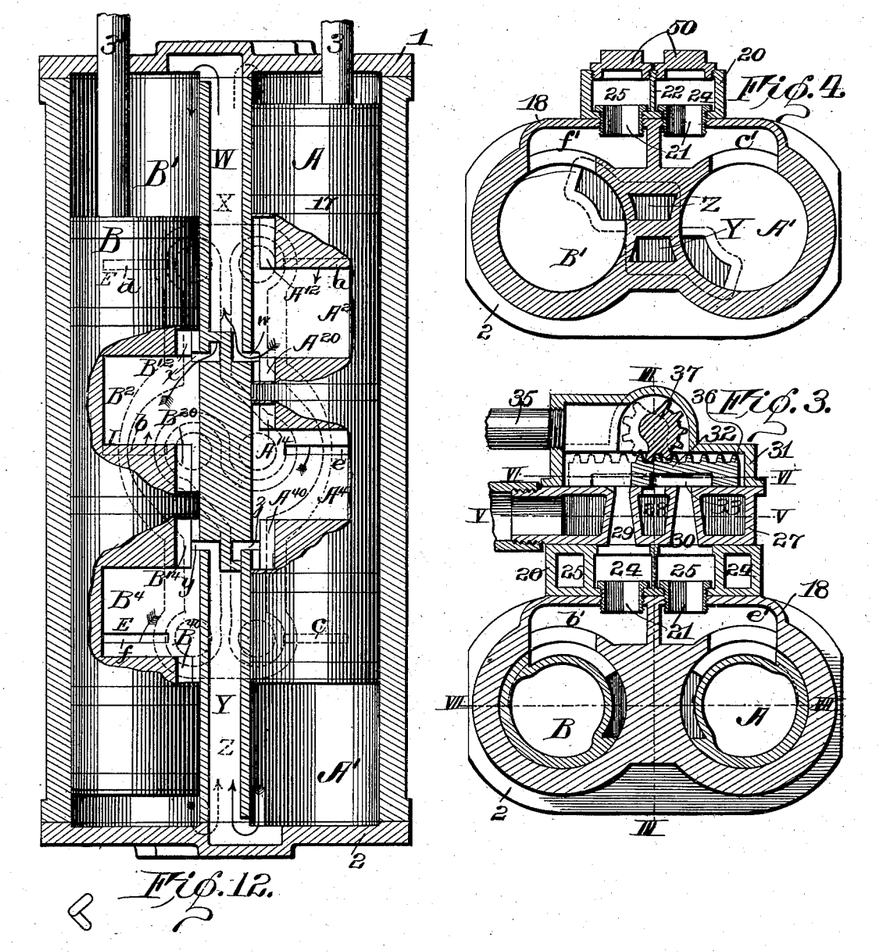
Fig. 3 is a cross-sectional view on the line I I of Fig. 1.
Fig. 4 is a similar view on the line II II of Fig. 1.
Figs. 10 to 14 are diagrammatic views illustrating the operation of the engine, the casing and portions of the pistons only, being shown in section and taken on a line VII VII of Fig. 3.
Figure 5:
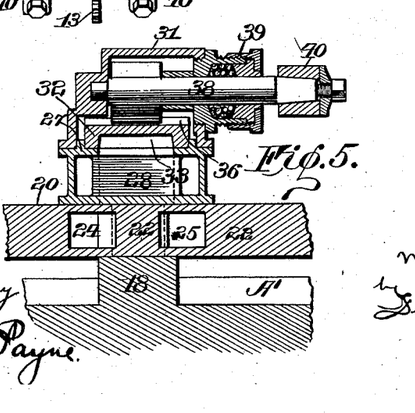
Fig. 5 is a sectional view on the line III III of Fig. 3.
Figure 10:
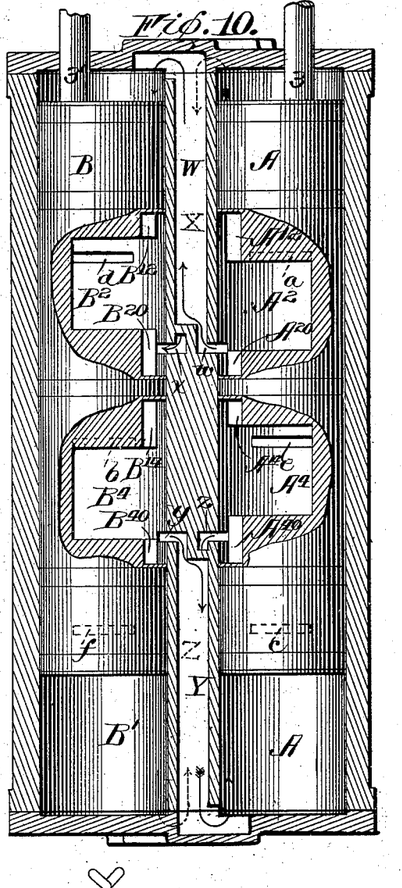

The ports $x$ and $w$ are connected by passages X and W, which lead to the tops of the cylinders A' and B', respectively, and the ports $y$ and $z$ are connected to the lower ends of said cylinders by the passages Y and Z, arranged between the side walls of the cylinders, similar to the passages W and X, suitable cavities in the cylinder-heads registering with the end of the passages and leading them into the cylinders, as shown in Figs. 4 and 10.

Figure 8:
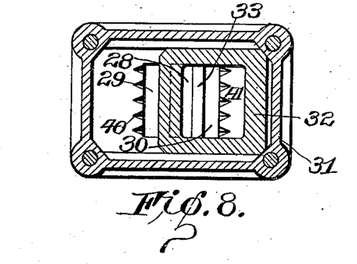
Fig. 8 is a cross-sectional view on the line VI VI of Fig. 3.
Figure 9:
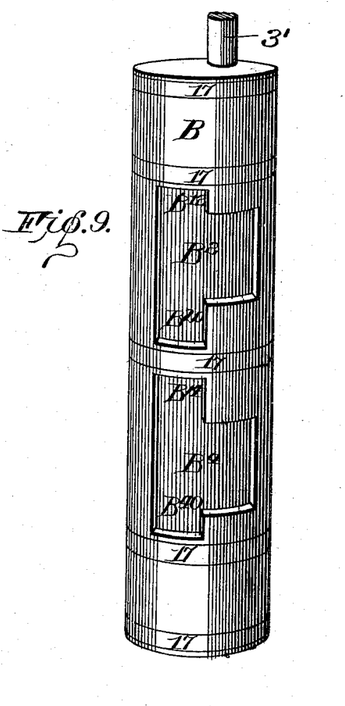
Fig. 9 is a perspective view of one of the pistons.

As the speed of the engine is controlled by the pressure and the amount of the steam admitted thereto, it is desirable to provide a means for regulating the amount to a very small quantity without the necessity of employing a delicate adjusting mechanism for governing the plate 32, which, in connection with the ports or passages 28, 29, and 30, constitutes a throttle-valve. This object I accomplish by providing in the outside edges of each of the passages 29 and 30 a series of V-shaped grooves 41, as shown particularly in Figs. 3 and 8, the apexes of which extend outwardly, forming tapered apertures which may be uncovered to a greater or less extent, as desired, by the movement of the plate 32.

From an inspection of the drawings it will be seen that the pistons A and B are provided with the recesses similar in size and outline, but placed on the pistons in reverse positions, so that on the piston B the longer extensions $B^{20}$ $B^{14}$ are arranged at the center, while on the piston A the corresponding shorter recesses $A^{20}$ $A^{14}$ are at the center, thereby causing the intervening portion between the recesses $A^2$ and $A^4$ on the latter piston to be narrower than the portion on the piston B lying between these recesses $B^2$ and $B^4$, and these portions between the recesses form intermediate piston-heads coöperating with the central ports $b$ and $e$. This difference in width is provided to arrange the lead and cut-off of the steam to obtain the greatest efficiency in the engine when operating in the usual direction; but it will be readily seen and understood that the pistons are in effect interchangeable and that if their positions are reversed the engine would exert the greatest efficiency when operating in the reverse direction.

In Figs. 10 to 14, inclusive, I have shown the operation of the engine in successive views taken at various portions of the stroke, said positions being indicated by the relative positions of the cranks during rotation.

The operation will now be readily understood. Beginning with the throttle in the position shown in Fig. 3 it will be seen that the live steam entering through the pipe 35 enters through the inlet-passage 29 into the passage 24, conducting it to the ports $a\ c$ in the cylinder $A'$ and also to the port $b$ in the cylinder $B'$. At the same time the ports $d$ and $f$ in the cylinder $B'$ and the port $e$ in the cylinder $A'$ are connected by the passage 25, through which the steam may be exhausted, passing thence to the passage 30 and through the throttle into the exhaust-passage 28. The location of the various ports in the cylinders and the arrangement of the recessed or cut-out portions of the pistons is made relative, so that the lead and cut-off of the steam—that is, the length of time it is permitted to enter the cylinder and the time during which it operates upon the piston by expansion—is proportioned to obtain the greatest efficiency therefrom. Likewise the exhaust-steam as it escapes from the cylinders is cut off at the proper time, so that a sufficient portion is retained to cushion the pistons at the end of each stroke, thereby preventing unnecessary hammering or vibration of the parts as the pistons reciprocate.

Commencing now with Fig. 10, the operation of the engine-ports will be described in detail. In this figure both the pistons A and B are in the upper portion of their cylinders, but moving in opposite directions, the former moving upward, the cut-out portion or recess $A^2$, just opening the port $a$, allowing the steam to enter therethrough to pass to the top of the opposite cylinder through the port $w$ and passage W, where it operates upon the piston B, which has been previously moving downward. While the piston B was at the uppermost portion of its stroke, the port $b$ was opened by the recess $B^4$ and the steam admitted from the passage 24 through the port $y$ and passage Y to the lower side of the piston A. In this figure the port $b$ has just been closed, and the piston A is moving upward by the expanding steam during the remainder of its movement, while the steam in the opposite end of this cylinder $A'$ is exhausting through the passage X and ports $x$ and $d$. The latter being closed by the upper edge of the recess $B^2$ just before the piston A reaches the limit of its upper movement, the remaining steam at the top of the cylinder is compressed therein to form a cushion as the crank passes over the center. The lower end of the cylinder $B'$ is also opened to permit the outward movement of the air or steam through the passage Z, ports $z$, and recesses $A^{40}\ A^4$ into the port $e$ and thence through the passage 25 to be finally exhausted through the passages 29 and 28.

Figure 11:
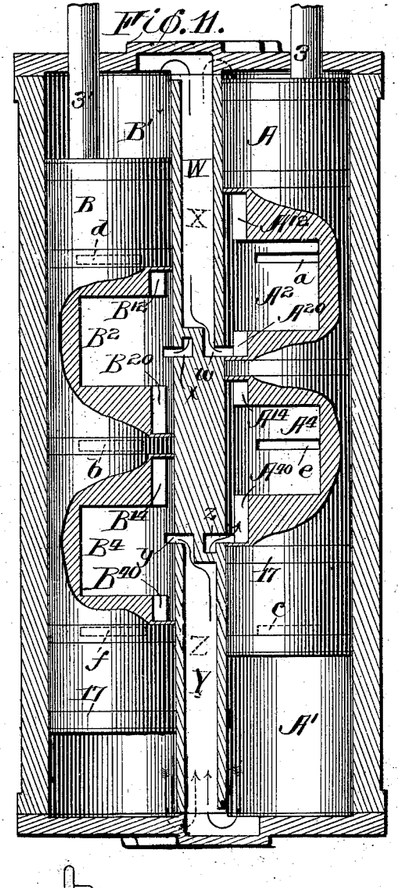
Figure 13:
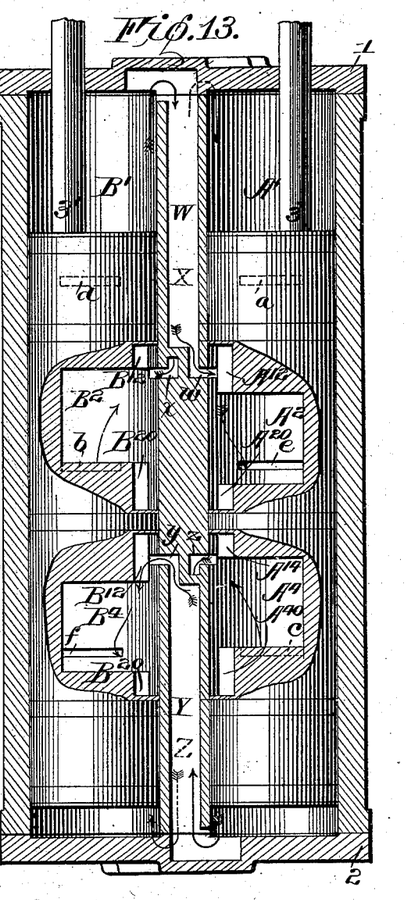
Figure 14:
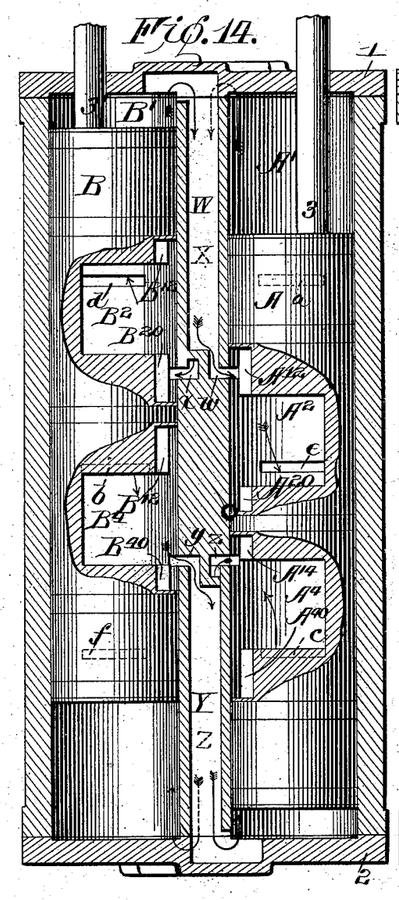

During the above-described action the pistons move to the positions shown in Fig. 11, when they both move downwardly, but with the piston B in advance of the piston A and receiving the live steam upon its upper end from the port $a$ through the recesses $A^2\ A^{20}$ and the port $w$ and passage W. The downward movement of the piston A closes the port $a$ simultaneously with the opening of the port $b$, which admits the live steam from the passage 24 through the recesses $B^2\ B^{20}$ to the port $x$ and thence by the passage X to the top of the cylinder $A'$, the steam into the lower ends of the cylinders $A'$ and $B'$ being exhausted through the passage Y, port $y$, recesses $B^{14}\ B^4$, and port $f$, and the passage Z, port $z$, recesses $A^{40}\ A^4$, and port $e$, respectively, as shown in Fig. 12. After the piston B reaches the limit of its downward movement and commences its reciprocation in the cylinder the piston A continues to move downwardly. In this position the third combination of inlet and exhaust ports is brought into operation. In Fig. 13 the piston A is completing its downward stroke by the expansion of the steam in the top of the cylinder, the port $b$ having been cut off by the edge of the recess $B^2$ in the piston B and the exhaust from the top of cylinder $B'$ opened through the passage W, port $w$, recesses $A^{12}$ and $A^2$ to the port $e$ previous to the opening of the port $c$ by the recess $A^4$. The continued downward movement of the piston A allows the inflowing steam to enter the lower end of the cylinder $B'$ by passing through the recesses $A^4\ A^{14}$ and the port Z and passage $z$. The piston B is then moved upwardly, followed by the upward movement of the piston A, closing the inlet-port $c$, as shown in Fig. 14, allowing the steam in the lower end of the cylinder $B'$ to expand and complete the upward movement of the piston therein. The cycle of operation is completed when the recess $B^4$ passes over the port $b$ to again open the inlet-passage to the lower end of the cylinder $A'$, when the piston A will be moved upward to the position shown in Fig. 10.

The arrangement of the parts I have shown provides an engine that is very compact and simple in construction and one that may be operated in either direction and its speed controlled entirely by the throttle-valve.

It will of course be understood that the pistons might be constructed of solid cylindrical bodies provided with any form of apertures or recesses adapted to register with the ports in the cylinders; but I prefer to employ the hollow form before referred to, as the weight of the parts may be greatly reduced. The passages leading from one cylinder to the other are comparatively short, and being arranged between the cylinders the parts are readily maintained in a heated condition; also, by making the recesses in the piston shallow the area of the steam-passages will not affect the proper operation of the engine either from the condensation of the steam therein or from other causes.

I claim as my invention—

1. In an engine, the combination with two cylinders each having two ports therein, and passages connecting said ports with the ends of the opposite cylinder, of three ports in each cylinder separate from the aforementioned ports, passages connecting the central port of each series with the outer ports of the opposite series, and pistons operating in the cylinders having recesses adapted to connect the center port and one of the end ports of each series with the first-mentioned ports in each cylinder.

2. In an engine, the combination with two cylinders each having two ports therein, and passages arranged between the cylinders connecting each of said ports with the proximate end of the opposite cylinder, of a series of ports in each cylinder separate from the aforementioned ports, passages connecting the central port of each series with the end ports of the opposite series, pistons operating in the cylinders having recesses therein adapted to alternately connect the central and one of the end ports of each of the series with the first-mentioned ports in each cylinder, and operating connections between the pistons.

3. In an engine, the combination with two cylinders each having two ports, and passages arranged between the cylinders leading from the ports to the opposite end of each cylinder, a series of ports arranged in each cylinder separate from the aforementioned ports, and passages connecting the central port of each series with the end ports of the opposite series, of the pistons having the recesses opposite the first-mentioned ports adapted to connect each of said ports alternately with the central port and the adjacent end port of the series arranged in the same cylinder, and operating connections between the pistons.

4. In an engine, the combination with two cylinders each having two ports at opposite sides of the middle, and passages connecting each of said ports with the proximate end of the other cylinder, a series of ports in each cylinder, arranged with the central port intermediate the two first-mentioned ports and the end ports located beyond the latter, and passages connecting the central port of each series with the end ports of the other series, of the pistons provided with the recesses opposite the first-mentioned ports and coöperating with the series of ports to alternately connect the central port thereof with the first-mentioned ports and also to connect the latter with the proximate end ports of the series, and operating connections between the pistons.

5. In an engine, the combination with two cylinders each having similar ports arranged at each side of their middle line, and passages leading from said ports to the adjacent ends of the opposite cylinder, an inlet-port in one cylinder arranged between the first-mentioned ports, and inlet-ports in the other cylinder located beyond the latter, exhaust-passages located in the first cylinder at either side of the inlet-passage, and an exhaust-passage located in the second cylinder between the two inlet-passages therein, of the pistons having the recesses opposite the first-mentioned ports adapted to coöperate with the inlet and exhaust passages in their respective cylinders, each of said pistons controlling the inflow and exhaust of the vapor to and from the other cylinder, and operating connections between the pistons.

6. In an engine, the combination with two cylinders, passages leading from the ends of each cylinder to the opposite cylinder and terminating in ports arranged on the proximate side of the middle line of the cylinders, of a series of ports leading into each cylinder, a shell arranged at the side of the cylinders having the passages therein connecting the central port of each series with the end ports of the opposite series, of the main inlet and exhaust passages, and a valve arranged between the latter and the passages in the shell whereby either of the series of ports in the cylinders may be operated conjointly with the other to permit the inlet of vapor to and its exhaust from the cylinders, the pistons in the cylinders having the recesses connecting the first-mentioned ports with their coöperating ports of the two series, and operating connections between the pistons.

7. In an engine, the combination with two cylinders having the ports at opposite sides of their middle line and passages leading therefrom to the proximate ends of the other cylinder, a series of inlet-ports, two of which are located in one cylinder outside of the first-mentioned ports and the other provided between said ports in the other cylinder, and a series of exhaust-ports located opposite the inlet-ports, one being provided in the first cylinder and two in the second, of the chambers on the cylinders communicating with the inlet and exhaust passages, a shell having the inlet and exhaust passages therein, and the hollow thimbles securing the sleeve to the cylinders and opening communication between the passages therein and the chambers, the pistons having the recesses coöperating with the first-mentioned ports and their conjointly-operating inlet and exhaust ports of the two series, and operating connections between the pistons.

8. In an engine, the combination with two cylinders having ports located at each side of their middle line, and passages leading from said ports to the adjacent end of the opposite cylinder, a series of ports in each cylinder arranged out of line with the first-mentioned ports, and passages connecting the center port of each series in one cylinder with the outer ports in the other cylinder, of the pistons operating over the series of ports, each piston having the recesses coöperating therewith to form the lead and cut-off of vapor passing to and from the other cylinder and provided with the extensions at the side of each recess opposite the first-mentioned ports whereby the latter are alternately connected with the central and proximate end ports of the series in their respective cylinders, and operating connections between the pistons.

9. In an engine, the combination with the cylinders having the communicating passages, inlet and exhaust ports in the cylinders, and the chambers communicating therewith on the exterior of the cylinders, of the shell having inlet and exhaust passages, hollow thimbles attaching the shell to the cylinders and connecting the respective passages therein to the chambers above the inlet and exhaust ports, said shell being provided with apertures above the thimbles and closures for said apertures, pistons operating in the cylinders having recesses coöperating with the inlet and exhaust ports and the passages between the cylinders, and operating connections between the pistons.

10. In an engine, the combination with two cylinders each having an imperforate head at one end, pistons reciprocating in the cylinders, and the piston-rods connected thereto, of a shaft mounted in bearings at the imperforate ends of the cylinders, cranks on the shaft arranged at an angle to each other, and the connecting-rods extending past the cylinders and attached to the cranks and to the separate piston-rods.

11. In an engine, the combination with two cylinders having imperforate and perforated heads at opposite ends, pistons reciprocating in the cylinders and provided with the rods operating through the perforated heads and guides, of slides mounted on the guides and connected to the rods, bearings at the imperforate ends of the cylinders carrying the shaft having the cranks, and connecting-rods extending past the cylinders and connecting the slides and cranks whereby a rotary motion is imparted to the shaft by the operation of the two pistons.

12. The combination with two cylinders having heads, at opposite ends, pistons reciprocating in the cylinders and provided with rods operating through the heads at the same end of each cylinder, guides on said heads and slides mounted on the guides and connected to the rods, of bearings at the opposite ends of the cylinders, a shaft journaled therein having cranks thereon arranged at an angle to each other and connecting-rods extending past the cylinders and connected to the cranks and slides whereby a rotary motion is imparted to the shaft by the operation of each piston.

13. In an engine, the combination with two cylinders, having the heads, ports in the cylinders, and passages connecting them with the ends of the opposite cylinder, two inlet-ports in one cylinder and one inlet in the other, two exhaust-ports in the latter, and one exhaust-port in the former cylinder, of the pistons having the recesses and provided with the rods operating through one of the heads, guides on the heads, and cross-heads moving on the guides and connected to the rods, a shaft mounted in bearings at the opposite end of the cylinders having the quartering-cranks, and the connecting-rods extending past the cylinders and attached to the cranks and cross-heads causing the pistons to move relatively in their cylinders.

14. In an engine, the combination with two cylinders each having similar ports therein, and passages connecting said ports and the ends of the cylinders, of two similar pistons operating in the cylinders and each having the outer piston-heads, the inner ends of which coöperate with cylinder-ports, and an intermediate head or abutment and similar surfaces formed at opposite sides of the intermediate abutment coöperating with ports in the cylinder and varying in extent longitudinally and circumferentially so as to coöperate with different sets of ports, and connections between the pistons whereby the surfaces and heads on one piston will control the operation of the other.

15. In an engine, the combination with the two cylinders, of the connecting-pistons operating therein each having two outer heads and an intermediate head or abutment, open passages leading from the outer end of each cylinder to the adjacent cylinder between the central piston-abutment and the outer piston-head at the corresponding end, ports arranged centrally of each of the cylinders to opposite sides of which the central piston-abutments are movable, ports in the cylinder arranged outwardly beyond the centrally-arranged ports with which the proximate faces of the several piston heads and abutments coöperate, and passages connecting the last-mentioned ports of the same cylinders.

16. In an engine, the combination with two cylinders having similar ports and passages, of two similar pistons operating therein connected for simultaneous operation, each having the outer heads and an intermediate head or abutment of varying width, open passages connecting the outer ends of each cylinder with the adjacent cylinder between the central piston-abutment and the piston-head at the corresponding end of the cylinder, and ports and passages controlled by the variant surfaces of the piston-heads whereby each piston controls the supply and exhaust of steam to the opposite one without other valve mechanism.

WILLIAM T. FOX.

Witnesses:
F. F. CHURCH,
ELIZABETH J. PERRY.